United States Patent
Pointner et al.

(10) Patent No.: US 12,421,114 B2
(45) Date of Patent: Sep. 23, 2025

(54) SULFAMYL FLUORIDE COMPOSITIONS AND PROCESSES FOR MAKING SULFAMYL FLUORIDE COMPOSITIONS

(71) Applicant: Honeywell International Inc., Charlotte, NC (US)

(72) Inventors: Bernard E. Pointner, Buffalo, NY (US); James V. Guiheen, Madison, NJ (US); Brian Leone, Morris Plains, NJ (US); Jon T. Herdlein, Buffalo, NY (US); Matthew H. Luly, Hamburg, NY (US)

(73) Assignee: Honeywell International Inc., Charlotte, NC (US)

( * ) Notice: Subject to any disclaimer, the term of this patent is extended or adjusted under 35 U.S.C. 154(b) by 848 days.

(21) Appl. No.: 17/582,562

(22) Filed: Jan. 24, 2022

(65) Prior Publication Data

US 2022/0242731 A1   Aug. 4, 2022

Related U.S. Application Data (60) Provisional application No. 63/143,102, filed on Jan. 29, 2021.

(51) Int. Cl.
*C01B 21/096* (2006.01)

(52) U.S. Cl.
CPC .................. *C01B 21/096* (2013.01)

(58) Field of Classification Search
CPC .................................... C01B 21/096
See application file for complete search history.

(56) References Cited

U.S. PATENT DOCUMENTS

| 3,379,509 A | 4/1968 | Appel |
| 8,337,797 B2 | 12/2012 | Honda et al. |

(Continued)

FOREIGN PATENT DOCUMENTS

| CN | 107986248 A | 5/2018 |
| CN | 108975292 A | 12/2018 |

(Continued)

OTHER PUBLICATIONS

WO2020216736A1 machine translation (Year: 2020).*

(Continued)

*Primary Examiner* — Michael Forrest
*Assistant Examiner* — Nicole Lee Quist
(74) *Attorney, Agent, or Firm* — Faegre Drinker Biddle & Reath LLP (57) ABSTRACT

A process for producing a sulfamyl fluoride composition includes providing a solution comprising fluorosulfonic acid, urea and a solvent; reacting the solution at a reaction temperature from 80° C. to about 170° C. to produce a mixture including sulfamyl fluoride, bis(fluorosulfonyl) imide, ammonium fluorosulfate and the solvent; separating the ammonium fluorosulfate from the mixture; and separating the mixture into a sulfamyl fluoride composition and a recycle composition, the sulfamyl fluoride composition including a higher concentration of sulfamyl fluoride and bis(fluorosulfonyl) imide than the recycle composition. A mole ratio of the fluorosulfonic acid to the urea in the solution is from about 1.80:1 to about 2.00:1.

8 Claims, 3 Drawing Sheets

(56) References Cited

U.S. PATENT DOCUMENTS

| | | |
|---|---|---|
| 8,580,220 B2 | 11/2013 | Honda et al. |
| 9,156,692 B2 | 10/2015 | Honda et al. |
| 9,181,173 B2 | 11/2015 | Johnson |
| 9,475,764 B2 | 10/2016 | Johnson |
| 10,122,048 B2 | 11/2018 | Buisine |
| 10,734,664 B1 | 8/2020 | Singh et al. |
| 2012/0009113 A1 | 1/2012 | Honda et al. |
| 2017/0183230 A1 | 6/2017 | Poshusta et al. |

FOREIGN PATENT DOCUMENTS

| | | | |
|---|---|---|---|
| CN | 109264682 A | 1/2019 | |
| CN | 109264683 A | 1/2019 | |
| CN | 109592655 A | 4/2019 | |
| CN | 110436424 A | 11/2019 | |
| CN | 112340713 A | 2/2021 | |
| JP | 5444453 B2 | 3/2014 | |
| JP | 2014-105115 A | 6/2014 | |
| JP | 5560136 B2 | 7/2014 | |
| KR | 10-1687374 B1 | 12/2016 | |
| WO | 2011/111780 A1 | 9/2011 | |
| WO | WO-2020216736 A1 * | 10/2020 | ............ B01J 14/00 |

OTHER PUBLICATIONS

Appel et al., "Die Synthese des Imidobisschwefelsäurefluorids, HN(SO2F)2", European Journal of Inorganic Chemistry, vol. 95, No. 1, 1962, 4 pages.

International Search Report and Written Opinion received for PCT Patent Application No. PCT/US2022/070412, mailed on May 13, 2022, 10 pages.

* cited by examiner

SULFAMYL FLUORIDE COMPOSITIONS AND PROCESSES FOR MAKING SULFAMYL FLUORIDE COMPOSITIONS

CROSS-REFERENCE TO RELATED APPLICATION

This application claims priority to Provisional Application No. 63/143,102, filed Jan. 29, 2021, which is herein incorporated by reference in its entirety.

FIELD

The present disclosure relates to sulfamyl fluoride compositions and processes for producing sulfamyl fluoride compositions.

BACKGROUND

Sulfamyl fluoride ($H_2NSO_2F$) is a strong acid useful in a number of applications including as a raw material in the production of lithium sulfamyl fluoride, which may be useful in lithium ion batteries.

Bis(fluorosulfonyl) imide (HFSI) is a key raw material in the production of lithium bis(fluorosulfonyl) imide (LiFSI), which is used in lithium ion batteries. HFSI can be prepared by several methods.

U.S. Pat. No. 8,337,797 to Honda et al. discloses that HFSI can be prepared by the reaction of urea with fluorosulfonic acid shown in Equation 1:

$$5HSO_3F + 2CO(NH_2)_2 \rightarrow HN(SO_2F)_2 + 2CO_2 + 3NH_4SO_3F. \quad \text{Eq. 1}$$

Honda discloses a two-step batch process for producing HFSI from urea and fluorosulfonic acid. In the first step, the urea is dissolved in the fluorosulfonic acid at a temperature low enough to prevent the reaction of Equation 1 between the urea and the fluorosulfonic acid. In the second step, the urea/fluorosulfonic acid solution is slowly added to separate reaction vessel including a reaction medium heated sufficiently for the reaction of Equation 1 to proceed. The controlled addition permits the heat generated by the exothermic reaction of Equation 1 to be controlled. U.S. Pat. No. 8,337,797 discloses that the heated reaction medium can be fluorosulfonic acid or HFSI, but it is preferable to use a mixture of fluorosulfonic acid and HFSI, with the HFSI serving to further control the reaction, especially at the beginning, when the urea/fluorosulfonic acid solution is first added to the heated reaction medium. However, the batch process as disclose in U.S. Pat. No. 8,337,797 is not sufficient for producing HFSI on an efficient, commercial scale.

International publication WO2011/111780, also to Honda et al., further discloses a recovery process to continuously remove reaction liquid from the reaction vessel, such as thorough an overflow outlet, continuously discharging the reaction liquid in a slurry state (including the ammonium salt byproduct). The process disclosed is done in production batches, with product HFSI added back to the reaction vessel ahead of the reaction for the next production batch.

Thus, there is a need to develop an efficient process that may be scaled to produce commercial quantities of sulfamyl fluoride and a more efficient process that may be scaled to produce commercial quantities of HFSI.

SUMMARY

The present disclosure provides sulfamyl fluoride compositions, processes for producing a sulfamyl fluoride composition and processes for producing HFSI from a sulfamyl fluoride composition.

In one embodiment, the present invention provides a process for producing a sulfamyl fluoride composition. The process includes providing a solution comprising fluorosulfonic acid, urea and a solvent, wherein a mole ratio of the fluorosulfonic acid to the urea is from about 1.80:1 to about 2.00:1; reacting the solution at a reaction temperature from 80° C. to about 170° C. to produce a mixture including sulfamyl fluoride, bis(fluorosulfonyl) imide, ammonium fluorosulfate and the solvent; separating the ammonium fluorosulfate from the mixture; and separating the mixture into the sulfamyl fluoride composition and a recycle composition, the sulfamyl fluoride composition including a higher concentration of sulfamyl fluoride and bis(fluorosulfonyl) imide than the recycle composition.

In another embodiment, the present invention provides a composition including sulfamyl fluoride and bis(fluorosulfonyl) imide, wherein a concentration of the sulfamyl fluoride is from about 1 mole percent to about 10 mole percent of a combination of the sulfamyl fluoride and the bis(fluorosulfonyl) imide.

In another embodiment, the present invention provides a composition including sulfamyl fluoride and bis(fluorosulfonyl) imide, wherein a concentration of the sulfamyl fluoride is from about 50 weight percent to about 99.9 weight percent of the composition.

The above mentioned and other features of the disclosure, and the manner of attaining them, will become more apparent and will be better understood by reference to the following description of embodiments taken in conjunction with the accompanying drawing.

DETAILED DESCRIPTION

The present disclosure provides integrated processes which may be scaled to produce commercial quantities of a sulfamyl fluoride composition from the reaction of fluorosulfonic acid and urea. It has been surprisingly found that limiting the ratio of fluorosulfonic acid to urea can dramatically improve process yields.

The present disclosure further provides integrated processes which may be scaled to produce commercial quantities of bis(fluorosulfonyl) imide from a sulfamyl fluoride composition. In some embodiments, the processes include recycling unreacted fluorosulfonic acid in an efficient and continuous manner. Alternatively, or additionally, in some embodiments, the processes include directing the recycled unreacted fluorosulfonic acid to a storage tank.

As disclosed herein, the sulfamyl fluoride is produced from a solution including urea, fluorosulfonic acid and a solvent. It has been surprisingly found that at mole ratios of fluorosulfonic acid to urea of 2.0:1, sulfamyl fluoride can be produced along with bis(fluorosulfonyl) imide at concentrations exceeding 3 mole percent of the combination of the sulfamyl fluoride and the bis(fluorosulfonyl) imide. At mole ratios of fluorosulfonic acid to urea of 1.9:1, sulfamyl fluoride can be produced along with bis(fluorosulfonyl) imide at concentrations exceeding 7 mole percent of the combination of the sulfamyl fluoride and the bis(fluorosulfonyl) imide. In contrast, at mole ratios of fluorosulfonic acid to urea of 2.5:1, the sulfamyl fluoride is produced at concentrations of less than 0.5 mole percent, and at mole ratios of fluorosulfonic acid to urea of 3.0:1 or greater, the sulfamyl fluoride is below 0.1 mole percent (see Example below).

However, the solubility limit of urea in fluorosulfonic acid is about 1 mole of urea for every 2.5 moles of fluorosulfonic acid, or a mole ratio of fluorosulfonic acid to urea of about 2.5:1. Thus, a compatible solvent is required to maintain the urea in solution at the desired mole ratios of fluorosulfonic acid to urea of 2.0:1 or lower. Compatible solvents can include bis(fluorosulfonyl) imide, sulfolane and dimethylformamide, for example.

A mole ratio of fluorosulfonic acid to urea in the solution of urea, fluorosulfonic acid and solvent may be as low as about 1.80:1, about 1.82:1, about 1.84:1, about 1.86:1, about 1.88:1 or about 1.90:1, or as high as about 1.92:1, about 1.94:1, about 1.96:1, about 1.98:1, or about 2.00:1, or within any range defined between any two of the foregoing values, such as about 1.80:1 to about 2.00:1, about 1.82:1 to about 1.98:1, about 1.84:1 to about 1.96:1, about 1.86:1 to about 1.94:1, about 1.88:1 to about 1.92:1, about 1.80:1 to about 1.98:1, about 1.80:1 to about 1.96:1, about 1.80:1 to about 1.94:1, about 1.80 to about 1.88 or about 1.92:1 to about 1.98:1, for example. Preferably, the mole ratio of fluorosulfonic acid to urea in the solution is from about 1.80 to about 1.98:1. More preferably, the mole ratio of fluorosulfonic acid to urea in the solution is from about 1.82:1 to about 1.96:1. Most preferably, the mole ratio of fluorosulfonic acid to urea in the solution is from about 1.84:1 to about 1.94:1.

In some embodiments, the solution of urea and fluorosulfonic acid may be formed by mixing the urea and the solvent together until the urea is dissolved, and then adding the urea/solvent solution to the fluorosulfonic acid. The urea and fluorosulfonic acid are believed to react in according to Equation 2:

$$2HSO_3F + CO(NH_2)_2 \rightarrow H_2NSO_2F + CO_2 + NH_4SO_3F. \quad \text{Eq. 2}$$

In the reaction of Equation 2, the urea ($CO(NH_2)_2$) and fluorosulfonic acid ($HSO_3F$) react to form sulfamyl fluoride ($H_2NSO_2F$), along with byproducts of carbon dioxide ($CO_2$) and ammonium fluorosulfate ($NH_4SO_3F$).

The reaction temperature for the reaction of Equation 2 may be as low as about 80° C., about 90° C., about 100° C., about 110° C., or about 120° C., or as high as about 130° C., about 140° C., about 150° C., about 160° C. or about 170° C., or within any range defined between any two of the foregoing values, such as about 80° C. to about 170° C., about 90° C. to about 160° C., about 100° C. to about 150° C., about 110° C. to about 140° C., about 120° C. to about 130° C., about 130° C. to about 150° C., or about 110° C. to about 120° C., for example. Preferably, the reaction temperature is from about 110° C. to about 140° C. More preferably, the reaction temperature is from about 120° C. to about 140° C. Most preferably, the reaction temperature is from about 120° C. to about 130° C.

The amount of urea available is greater than or equal to the stoichiometric amount according the Equation 2 to limit the availability of fluorosulfonic acid for side reactions as described below. In some embodiments, unreacted urea precipitates out with the ammonium fluorosulfate. In some embodiments, the unreacted urea decomposes to produce ammonia and carbon dioxide if the conditions are acidic and the temperature is greater than about 130° C. The ammonia may react with fluorosulfonic acid to produce ammonium fluorosulfate.

Two side reactions may also occur that consume the desired sulfamyl fluoride. In one of the sulfamyl fluoride consuming reactions, the sulfamyl fluoride reacts with available fluorosulfonic acid to form bis(fluorosulfonyl) imide along with byproducts of carbon dioxide, ammonium fluorosulfate and water according to Equation 3:

$$HSO_3F + H_2NSO_2F \rightarrow HN(SO_2F)_2 + H_2O. \quad \text{Eq. 3}$$

Evidence of the reaction schemes of Equation 2 and Equation 3 was found by monitoring the level of sulfamyl fluoride in response to alternating additions of urea and fluorosulfonic acid. It was found that adding urea increased the concentration of sulfamyl fluoride and adding fluorosulfonic acid decreased the concentration of sulfamyl fluoride. Without wishing to be bound by any theory, it is believed that by limiting the available fluorosulfonic acid (by limiting the ratio of fluorosulfonic acid to urea), more of the fluorosulfonic acid is consumed in the reaction of Equation 2, leaving less fluorosulfonic acid to be consumed in the reaction of Equation 3, thus reducing the amount of sulfamyl fluoride consumed to form bis(fluorosulfonyl) imide. In this way, the concentration of sulfamyl fluoride in the resulting composition can be increased to levels suitable for further commercial use, such as the production of additional bis(fluorosulfonyl) imide, or for separation from the bis(fluorosulfonyl) imide to produce a sulfamyl fluoride composition.

In another one of the sulfamyl fluoride consuming reactions, the sulfamyl fluoride reacts with water produced in Equation 3 to form additional ammonium fluorosulfate according to Equation 4:

$$H_2O + H_2NSO_2F \rightarrow NH_4SO_3F. \quad \text{Eq. 4}$$

Limiting the water available for the reaction of Equation 4 can be accomplished by limiting the reaction of Equation 3, as discussed above. Additionally, or alternatively, the water available for the reaction of Equation 4 can be limited by removing the water from the mixture. For example, in some embodiments, a flow of a dry inert gas, such as nitrogen or carbon dioxide, can be bubbled through the mixture, carrying away water from the mixture.

The mixture produced by the reaction of Equation 2 includes sulfamyl fluoride, ammonium fluorosulfate and the solvent. The mixture can also include bis(fluorosulfonyl) imide because the reaction of Equation 3 is not entirely suppressed and some of the sulfamyl fluoride produced by the reaction of Equation 2 can react with some of the fluorosulfonic acid not yet consumed by the reaction of Equation 2. The mixture may be in the form of a slurry if the solvent is not sufficient to dissolve the ammonium fluorosulfate produced. Alternatively, the mixture may be in the form of a solution.

In some embodiments, the weight ratio of the solvent to the urea and fluorosulfonic acid is high enough to completely dissolve the reaction byproducts, including the ammonium fluorosulfate, in the mixture so as to prevent the need to handle a slurry. However, increasing the amount of solvent reduces the efficiency of the process to the extent that it requires larger systems and increased energy usage to separate the sulfamyl composition from the solvent. Thus, in some embodiments, it is desirable to use a lower weight ratio of the solvent to the urea and fluorosulfonic acid, resulting in the formation of a slurry including undissolved ammonium fluorosulfate.

The carbon dioxide gas produced may be vented or captured for other uses. The water produced may be separated and neutralized as it will contain residual acids The ammonium fluorosulfate is separated from the mixture. The ammonium fluorosulfate may be separated by evaporation, spray drying, filtration, or any combination thereof, for example.

After the ammonium fluorosulfate is separated from the mixture, the mixture is separated into a sulfamyl fluoride composition and a recycle composition. The sulfamyl fluoride composition includes a higher concentration of the sulfamyl fluoride than the recycle composition. In some embodiments, the recycle composition is recycled back to the reaction. In some embodiments, the recycle composition may alternatively, or additionally, be directed to a storage tank for later use. The separation may be by distillation, for example.

It has been found that a concentration of sulfamyl fluoride in the sulfamyl fluoride composition may be as low as about 1 mole percent (mol. %), about 2 mol. %, about 3 mol. %, about 4 mol. %, or about 5 mol. %, or as high as about 6 mol. %, about 7 mol. %, about 8 mol. %, about 9 mol. %, or about 10 mol. % or be within any range defined between any two of the foregoing values, such as about 1 mol. % to about 10 mol. %, about 2 mol. % to about 9 mol. %, about 3 mol. % to about 8 mol. %, about 4 mol. % to about 7 mol. %, about 5 mol. % to about 6 mol. %, about 5 mol. % to about 8 mol. %, about 2 mol. % to about 5 mol. %, or about 6 mol. % to about 10 mol. %, for example. Preferably, the concentration of sulfamyl fluoride in the sulfamyl fluoride composition is from about 2 mol. % to about 9 mol. %. More preferably, the concentration of sulfamyl fluoride in the sulfamyl fluoride composition is from about 3 mol. % to about 8 mol. %. Most preferably, the concentration of sulfamyl fluoride in the sulfamyl fluoride composition is from about 4 mol. % to about 8 mol. %. The concentration of sulfamyl fluoride in the sulfamyl fluoride composition is the mol. % of the combination of the sulfamyl fluoride and the bis(fluorosulfonyl) imide.

In some embodiments, the sulfamyl fluoride can be separated from the sulfamyl fluoride composition to form a concentrated sulfamyl fluoride composition. The separation can be by distillation, for example. The concentrated sulfamyl fluoride composition can be used, for example, to produce an electrolyte for a lithium battery.

A concentration of sulfamyl fluoride in the concentrated sulfamyl fluoride composition may be as low as about 50 weight % (wt. %), about 60 wt. %, about 70 wt. %, about 80 wt. %, or about 90 wt. %, or as high as about 95 wt. %, about 97 wt. %, about 98 wt. %, about 99 wt. %, about 99.5 wt. % or about 99.9 wt. %, or be within any range defined between any two of the foregoing values, such as about 50 wt. % to about 99.9 wt. %, about 60 wt. % to about 99.5 wt. %, about 70 wt. % to about 99 wt. %, about 80 wt. % to about 98 wt. %, about 90 wt. % to about 97 wt. %, about 50 wt. % to about 70 wt. %, about 98 wt. % to about 99.9 wt. %, or about 99.5 wt. % to about 99.9 wt. %, for example. Preferably, the concentration of sulfamyl fluoride in the sulfamyl fluoride composition is from about 90 wt. % to about 99.9 wt. %. More preferably, the concentration of sulfamyl fluoride in the sulfamyl fluoride composition is from about 95 wt. % to about 99.9 wt. %. Most preferably, the concentration of sulfamyl fluoride in the sulfamyl fluoride composition is from about 99.5 wt. % to about 99.9 wt. %. The concentration of sulfamyl fluoride in the concentrated sulfamyl fluoride composition is the wt. % of the concentrated sulfamyl fluoride composition.

The sulfamyl fluoride composition and/or the concentrated sulfamyl fluoride composition can be used to produce bis(fluorosulfonyl) imide (HFSI) by employing the reaction of Equation 3 as a primary reaction. The sulfamyl fluoride composition and/or the concentrated sulfamyl fluoride composition can be mixed with additional fluorosulfonic acid in a reactor to react and form a crude HFSI product composition and a volatile composition. The volatile composition may be removed by operating the reactor under vacuum (vacuum reactor) and/or by flowing a carrier gas, such as nitrogen or argon, through the reactor. The volatile composition includes unreacted fluorosulfonic acid and water. The crude HFSI product composition includes bis(fluorosulfonyl) imide, ammonium fluorosulfate, unreacted fluorosulfonic acid and unreacted sulfamyl fluoride.

The reaction temperature for reacting the sulfamyl fluoride in the sulfamyl fluoride composition with the fluorosulfonic acid may be as low as about 80° C., about 90° C., about 100° C., about 110° C., or about 120° C., or as high as about 130° C., about 140° C., about 150° C., about 160° C. or about 170° C., or within any range defined between any two of the foregoing values, such as about 80° C. to about 170° C., about 90° C. to about 160° C., about 100° C. to about 150° C., about 110° C. to about 140° C., about 120° C. to about 130° C., about 130° C. to about 150° C., or about 110° C. to about 120° C., for example. Preferably, the reaction temperature is from about 110° C. to about 140° C. More preferably, the reaction temperature is from about 120° C. to about 140° C. Most preferably, the reaction temperature is from about 120° C. to about 130° C.

The reaction pressure for reacting the sulfamyl fluoride in the sulfamyl fluoride composition with the fluorosulfonic acid is less than 1 bar absolute to draw off the volatile composition including the water. Drawing off the water can increase the yield of bis(fluorosulfonyl) imide, because the water may react with some of the sulfamyl fluoride and produce ammonium fluorosulfate instead of bis(fluorosulfonyl) imide, as shown in Equation 4 above. Drawing off the water reduces this consumption of sulfamyl fluoride, enhancing the yield of bis(fluorosulfonyl) imide from the sulfamyl fluoride.

Thus, by separating the production of the bis(fluorosulfonyl) imide into two steps, the first step making the sulfamyl fluoride composition and/or concentrated sulfamyl fluoride composition and the second step reacting the sulfamyl fluoride in the sulfamyl fluoride composition with fluorosulfonic acid and drawing off the water, the amount of ammonium fluorosulfate produced over all may be reduced, improving the overall yield and efficiency of the process.

The crude HFSI product composition includes bis(fluorosulfonyl) imide, ammonium fluorosulfate, some of the unreacted fluorosulfonic acid and some of the unreacted sulfamyl fluoride. As the reaction proceeds largely to completion, due to a stoichiometric excess of fluorosulfonic acid, little of the sulfamyl fluoride remains in the crude HFSI product composition.

A concentration of sulfamyl fluoride in the crude HFSI product composition may be less than about 0.5 mol. %, less than about 0.4 mol %, less than about 0.3 mol. %, less than about 0.2 mol % or less than about 0.1 mol. %, or within any range defined between any two of the foregoing values.

The ammonium fluorosulfate is separated from the crude HFSI product composition to form an HFSI product composition. The ammonium fluorosulfate may be separated by evaporation, spray drying, filtration, or any combination thereof, for example.

After the ammonium fluorosulfate is separated from the crude HFSI product composition, the resulting HFSI product composition is separated into a concentrated HFSI product composition and a top stream composition. The concentrated HFSI product composition includes a higher concentration of the bis(fluorosulfonyl) imide than the top stream composition. The top stream composition includes the water and unreacted fluorosulfonic acid. The separation may be by distillation, for example.

In some embodiments, the top stream is separated into an aqueous composition and an FSA-rich composition. The FSA-rich composition includes a higher concentration of fluorosulfonic acid than the aqueous composition. In some embodiments, the FSA-rich composition is recycled back to the reactor. In some embodiments, the FSA-rich composition may alternatively, or additionally, be directed to a storage tank for later use. The separation may be by distillation, for example.

In some embodiments, the volatile composition is separated into a condensed stream and an uncondensed stream. The condensed stream includes most of the unreacted fluorosulfonic acid in the volatile composition. The condensed stream may be recycled back to the reactor. The uncondensed stream includes the water and the balance of the unreacted fluorosulfonic acid in the volatile composition. The uncondensed stream can be separated into an aqueous composition and an FSA-rich composition. The FSA-rich composition includes a higher concentration of fluorosulfonic acid than the aqueous composition. In some embodiments, the FSA-rich composition is recycled back to the reactor. In some embodiments, the FSA-rich composition may alternatively, or additionally, be directed to a storage tank for later use. The separation may be by distillation, for example.

In some embodiments, the separation of the uncondensed stream into the aqueous composition and the FSA-rich composition may be performed in the same separation systems as the separation of the top stream into the aqueous composition and the FSA-rich composition. In other embodiments, these separation steps are performed in their own separation systems.

In some embodiments, the processes described above are continuous processes. In some other embodiments, the processes described above are semi-batch. By semi-batch, it is meant that while significant portions of the process are continuous, the entire process is not continuous. For example, in some semi-batch embodiments, the sulfamyl fluoride composition may be produced and stored in continuous fashion for some period of time, and then at a later time, the stored sulfamyl fluoride composition may be used to produce bis(fluorosulfonyl) imide in a continuous fashion.

Figure 1:
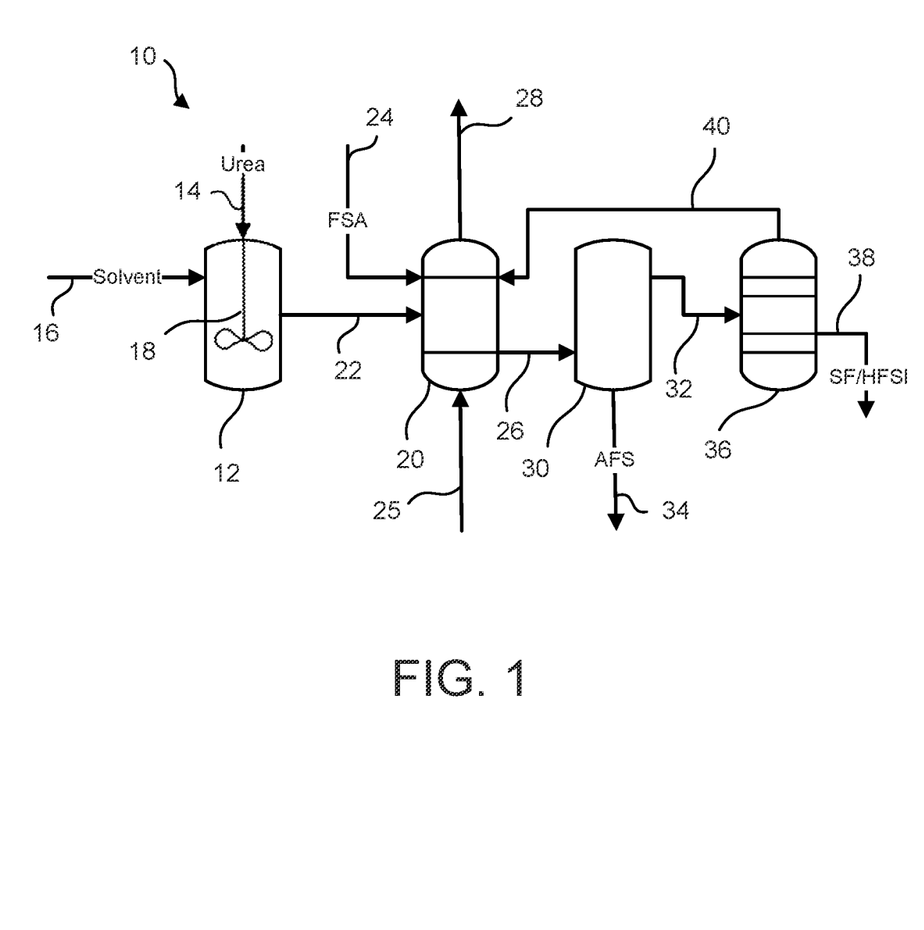
FIG. 1 is a process flow diagram showing an integrated process for the continuous manufacturing a sulfamyl fluoride composition, according to some embodiments of this disclosure.

FIG. 1 is a process flow diagram showing an integrated process for the continuous manufacturing a sulfamyl fluoride composition, according to some embodiments of this disclosure. FIG. 1 shows a system 10 including a vessel 12 configured to connect to a urea input 14 and a solvent input 16. The solvent in the solvent input 16 is in liquid form and may be continuously pumped into the vessel 12. Alternatively, the solvent in the solvent input 16 may be added as a batch. Urea in the urea input 14 is in solid form and may be continuously provided to the vessel 12 by a solid conveying system (not shown), for example. Alternatively, the urea in the urea input 14 may be added to the vessel 12 as a batch.

The vessel 12 is equipped with a mixing device 18, such as an agitator, for example, and an optional heating and cooling mechanism (not shown), such as a heat transfer coil, for example. In the vessel 12, the urea from the urea input stream 14 and the solvent from the solvent input stream 16 are mixed by the mixing device 18.

A reactor 20 is fluidly coupled to the vessel 12 to receive a urea solution 22 including the urea and the solvent from the vessel 12. The reactor 20 includes a first fluorosulfonic acid input 24 to provide fluorosulfonic acid to the reactor 20. The fluorosulfonic acid and the urea solution form a solution comprising fluorosulfonic acid, urea and the solvent within the reactor. A mole ratio of fluorosulfonic acid to the urea is as described above. The reactor 20 may also include an inert gas input 25 to provide a dry inert gas to bubble through the solution. The reactor 20 is heated to a reaction temperature, as described above, and the reactants react according to Equation 2 to produce a mixture 26 including sulfamyl fluoride, bis(fluorosulfonyl) imide, ammonium fluorosulfate and the solvent. The carbon dioxide produced by the reaction may be vented from the reactor 20 through a reactor vent 28. The dry inert gas bubbles through the solution, absorbing water produced by the side reaction of Equation 3 above. The inert gas with the absorbed water may also be vented from the reactor through the reactor vent 28. The reactor 20 is configured to maintain the reaction temperature by way of a fluid flowing through a heat exchanger or jacketed reactor (not shown), or by an electric heating coil (not shown), for example.

A first separator 30 is fluidly connected to the reactor 20 to receive the mixture 26 including sulfamyl fluoride, bis(fluorosulfonyl) imide, ammonium fluorosulfate, unreacted fluorosulfonic acid and the solvent. The first separator 30 is configured to separate the ammonium fluorosulfate from the mixture 26 to produce a mixture 32. The ammonium fluorosulfate is removed by a purge 34. The first separator 30 can be an evaporator, a spray drier, a filter, a centrifuge, or any combination thereof, for example.

A second separator 36 is fluidly connected to the first separator 30 to receive the mixture 32 including sulfamyl fluoride, bis(fluorosulfonyl) imide, unreacted fluorosulfonic acid and the solvent. The second separator 36 is configured to produce a sulfamyl fluoride composition 38 and a recycle composition 40. The second separator 36 can be a distillation column, for example. The sulfamyl fluoride composition 38 includes a concentration of sulfamyl fluoride that is greater than a concentration of sulfamyl fluoride in the recycle composition 40. The concentration of sulfamyl fluoride in the sulfamyl fluoride composition 38 is as described above.

The reactor 20 is fluidly connected to the second separator 36 to receive the recycle composition 40. Alternatively, or additionally, the second separator 36 is fluidly coupled to a recycle storage tank (not shown). Thus, the recycle composition 40 can be directed to the reactor 20 for continuous operation, or to the recycle storage tank for semi-batch operation.

In some embodiments, the sulfamyl fluoride composition 38 can be directed to a product storage tank (not shown) for later processing. In other embodiments, the sulfamyl fluoride composition 38 can be directed to a distillation column (not shown) to produce a concentrated sulfamyl fluoride composition, as described above. The concentrated sulfamyl fluoride composition can be used as a precursor to a salt for an electrolyte for lithium ion batteries.

Figure 2:
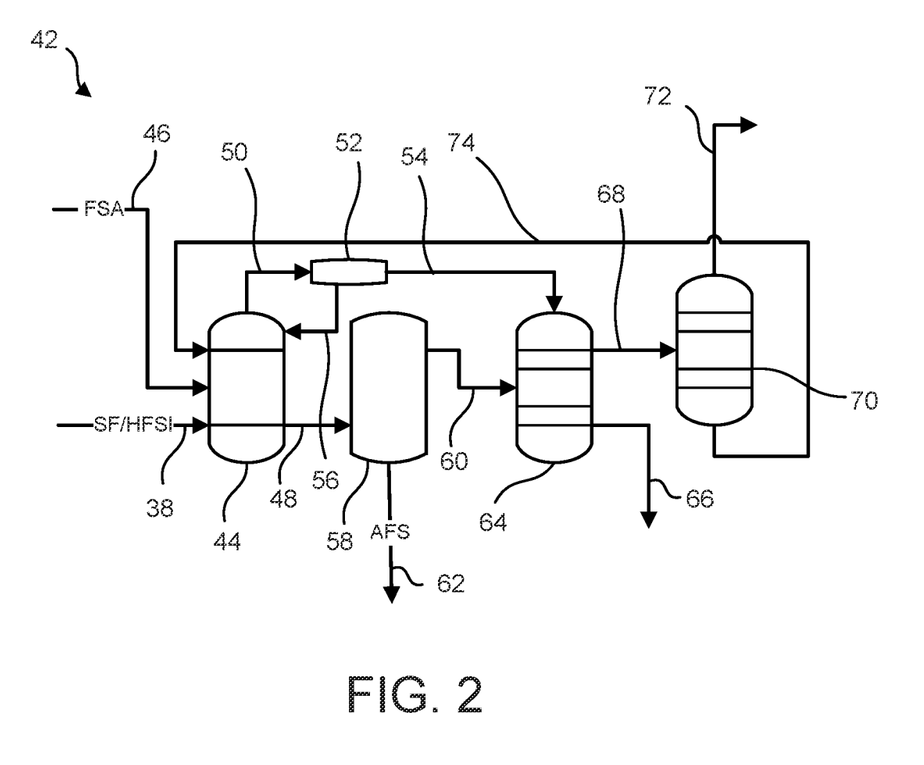
FIG. 2 is a process flow diagram showing an integrated process for the continuous manufacturing of bis(fluorosulfonyl) imide from a sulfamyl fluoride composition, according to some embodiments of this disclosure.

In some embodiments, the sulfamyl fluoride composition 38 (or the concentrated sulfamyl fluoride composition) can be used to produce bis(fluorosulfonyl) imide, as shown in FIG. 2. FIG. 2 is a process flow diagram showing an integrated process for the continuous manufacturing of bis(fluorosulfonyl) imide from a sulfamyl fluoride composition and/or a concentrated sulfamyl fluoride composition, according to some embodiments of this disclosure. FIG. 2 shows a system 42 including a reactor 44 configured to connect to a supply of the sulfamyl fluoride composition 38 and a supply of additional fluorosulfonic acid 46. The sulfamyl fluoride composition 38 and the additional fluorosulfonic acid 46 form a mixture within the reactor 44. The reactor 44 is heated to a reaction temperature as described above. The reactants react according to Equation 3 to produce a crude HFSI product composition 48 and a volatile composition 50.

The reactor 44 is configured to maintain the reaction temperature by way of a fluid flowing through a heat exchanger or reactor jacket (not shown), or by an electric heating coil (not shown), for example. In some embodiments, the reactor is a vacuum reactor using a vacuum to remove the volatile composition 50 from the reactor 44. In some embodiments, the reactor is supplied by a carrier gas, such as nitrogen or argon, to remove the volatile composition 50 from the reactor 44.

The crude HFSI product composition 48 includes bis(fluorosulfonyl) imide, ammonium fluorosulfate, unreacted fluorosulfonic acid, and unreacted sulfamyl fluoride. A concentration of the unreacted sulfamyl fluoride in the crude HFSI product composition 48 is as described above. The volatile composition 50 includes water and unreacted fluorosulfonic acid.

A condenser 52 is fluidly connected to the reactor 44 to separate the volatile composition 50 into an uncondensed stream 54 and a condensed stream 56. The condensed stream 56 includes most of the unreacted fluorosulfonic acid in the volatile composition 50. The condensed stream 56 is fluidly connected to the reactor 44 to return the unreacted fluorosulfonic acid to the reactor 44. The uncondensed stream 54 includes the water and the remaining unreacted fluorosulfonic acid.

A third separator 58 is fluidly connected to the reactor 44 to receive the crude HFSI product composition 48. The third separator 58 is configured to separate the ammonium fluorosulfate from the crude HFSI product composition 48 to produce an HFSI product composition 60. The ammonium fluorosulfate is removed by a purge 62. The third separator 58 can be an evaporator, a spray drier, a filter, a centrifuge, or any combination thereof, for example.

A fourth separator 64 is fluidly connected to the third separator 56 to receive the HFSI product composition 60 including bis(fluorosulfonyl) imide, unreacted fluorosulfonic acid, and unreacted sulfamyl fluoride. The fourth separator 64 is also fluidly connected to the condenser 52 to receive the uncondensed stream 54 including water and some of the unreacted fluorosulfonic acid. The fourth separator 64 is configured to separate the HFSI product composition 60 into a concentrated HFSI product composition 66 and a top stream 68. The fourth separator 64 can be a distillation column, for example. The concentrated product composition 66 includes a concentration of bis(fluorosulfonyl) imide as described above. The concentrated product composition 66 can be directed to a product storage tank (not shown) for later processing, refinement, or use as an electrolyte for lithium ion batteries. The top stream 68 includes water and unreacted fluorosulfonic acid.

A fifth separator 70 is fluidly connected to the fourth separator 64 to receive the top stream 68 including the water and unreacted fluorosulfonic acid from the HFSI product composition 60 and from the uncondensed stream 54. The fifth separator 70 is configured to separate the top stream 68 into an aqueous composition 72 and an FSA-rich composition 74. The fifth separator 70 can be a distillation column, for example. The aqueous composition 72 can include the water produced as shown in Equation 3 and acids produced in other side reactions. The aqueous composition 72 may be sent to a caustic scrubber (not shown) for treatment. The FSA-rich composition 74 can include unreacted fluorosulfonic acid.

In some embodiments, the condenser 52 is alternatively, or additionally, fluidly connected directly to the fifth separator 70 to receive the uncondensed stream 54 including water and some of the unreacted fluorosulfonic acid. The fifth separator 70 is configured to separate uncondensed stream 54, along with the top stream 68, into the aqueous composition 72 and an FSA-rich composition 74.

The reactor 44 is fluidly connected to the fifth separator 70 to receive the FSA-rich composition 74. Alternatively, or additionally, the fifth separator 64 is fluidly coupled to a recycle storage tank (not shown). Thus, the FSA-rich composition 74 can be directed to the reactor 44 for continuous operation, or to the recycle storage tank for semi-batch operation.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value. As used herein, the singular forms "a", "an" and "the" include plural unless the context clearly dictates otherwise.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

Example

Effect of the Ratio of Fluorosulfonic Acid to Urea in the Production of Sulfamyl Fluoride In this Example, the effect of the ratio of fluorosulfonic acid to urea in the production yield of sulfamyl fluoride in a sulfamyl fluoride composition is demonstrated. Eight experiments were performed, each with a different ratio of fluorosulfonic acid to urea. For each experiment, some of the fluorosulfonic acid and the urea were mixed together and then added to a reactor containing the balance of the fluorosulfonic acid pre-heated to 80° C. to 140° C. The addition typically occurred over about 1 to 2 hours. Once the addition was completed, the reaction mixture was maintained at 80° C. to 140° C. for an additional 2 to 3 hours to ensure completion of the reaction. The contents of the reactor were then heated to about 160° C. and distilled under reduced pressure of 0 to 10 Torr, to separate the HFSI produced and the unreacted fluorosulfonic acid from the ammonium fluorosulfate produced. The recovered distillate was analyzed by 19F NMR to determine the mole percentages of HFSI, fluorosulfonic acid and sulfamyl fluoride. The results are shown in FIG. 3.

Figure 3:
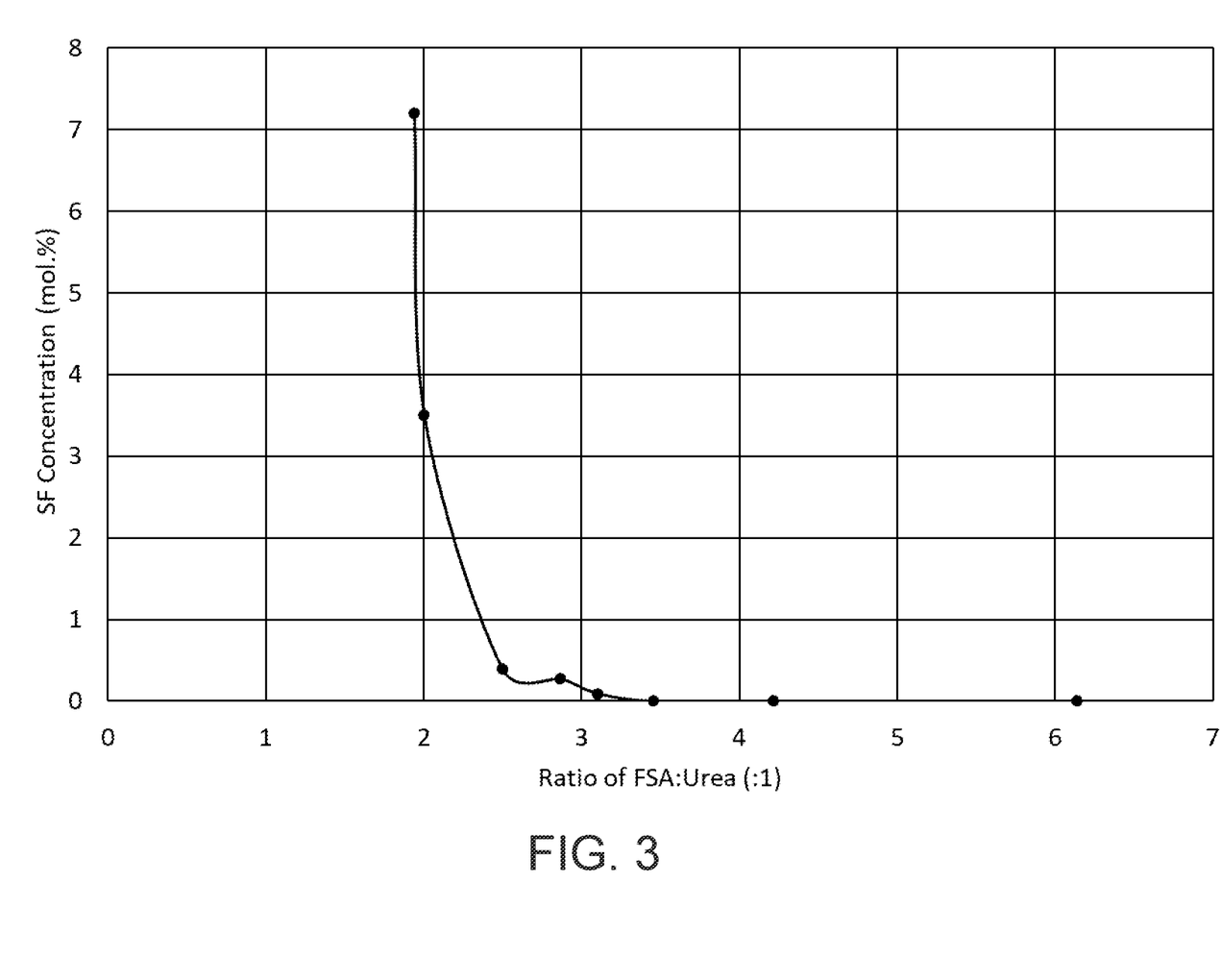
FIG. 3 is a graph of sulfamyl fluoride concentration as a function of the ratio of fluorosulfonic acid to urea.

FIG. 3 is a graph of the sulfamyl fluoride concentration for each experiment as a function of the mole ratio of fluorosulfonic acid to urea (FSA:urea). As shown in FIG. 3, the sulfamyl fluoride concentration is less than 0.1 mol. % at FSA:urea ratios of 3:1 or greater. Even as low as FSA:urea ratio of 2.5:1, the sulfamyl fluoride concentration is below 0.5 mol. %. Not until the FSA:urea ratio reaches 2.0:1 does the sulfamyl fluoride concentration become significant at about 3.5 mol. %. The sulfamyl fluoride concentration increases dramatically below the FSA:urea ratio of 2.0:1, resulting in a sulfamyl fluoride concentration of 7.2 mol. % at an FSA:urea ratio of 1.9:1. This surprising result demonstrates that the process can produce significant sulfamyl fluoride yields at FSA:urea ratios at or below 2.0:1.

Aspects

Aspect 1 is a process for producing a sulfamyl fluoride composition, the process including providing a solution including fluorosulfonic acid, urea and a solvent, wherein a mole ratio of the fluorosulfonic acid to the urea is from about 1.80:1 to about 2.00:1; reacting the solution at a reaction temperature from 80° C. to about 170° C. to produce a mixture including sulfamyl fluoride, bis(fluorosulfonyl) imide, ammonium fluorosulfate and the solvent; separating the ammonium fluorosulfate from the mixture; and separating the mixture into the sulfamyl fluoride composition and a recycle composition, the sulfamyl fluoride composition including a higher concentration of sulfamyl fluoride and bis(fluorosulfonyl) imide than the recycle composition.

Aspect 2 is the process of Aspect 1, further including recycling the recycle composition back to the reacting step.

Aspect 3 is the process of Aspect 1 or Aspect 2, wherein the process is a continuous process.

Aspect 4 is the process of Aspect 1 or Aspect 2, wherein the process is a semi-batch process.

Aspect 5 is the process of any of Aspects 1-4, wherein the solvent includes at least one selected from: bis(fluorosulfonyl) imide, sulfolane and dimethylformamide.

Aspect 6 is the process of and of Aspects 1-5, wherein a concentration of the sulfamyl fluoride in the sulfamyl fluoride composition is from about 1 mole percent to about 10 mole percent of the combination of the sulfamyl fluoride and bis(fluorosulfonyl) imide.

Aspect 7 is the process of any of Aspects 1-6, wherein in the providing step, the mole ratio of the fluorosulfonic acid to the urea is from about 1.80:1 to about 1.90:1; and in the separating the mixture into the sulfamyl fluoride composition and the recycle composition step, the concentration of the sulfamyl fluoride in the sulfamyl fluoride composition is from about 4 mole percent to about 8 mole percent of a combination of the sulfamyl fluoride and bis(fluorosulfonyl) imide.

Aspect 8 is the process of any of Aspects 1-7, wherein separating the ammonium fluorosulfate from the mixture includes evaporating the mixture to form the sulfamyl fluoride composition.

Aspect 9 is the process of any of Aspects 1-10, wherein separating the mixture into a sulfamyl fluoride composition and a recycle composition includes distilling the mixture.

Aspect 10 is the process of any of Aspects 1-9, further including separating the sulfamyl fluoride from the sulfamyl fluoride composition to form a concentrated sulfamyl fluoride composition, wherein a concentration of sulfamyl fluoride in the concentrated sulfamyl fluoride composition is from about 50 weight percent to about 99.9 weight percent of the concentrated sulfamyl fluoride composition.

Aspect 11 is the process of any of Aspects 1-11, further including mixing the sulfamyl fluoride composition with additional fluorosulfonic acid; reacting the mixture of the sulfamyl fluoride composition and the additional fluorosulfonic acid in a reactor at a reaction temperature from 80° C. to about 170° C. to produce a crude HFSI product composition and a volatile composition, the volatile composition including fluorosulfonic acid and water, and the crude HFSI product composition including bis(fluorosulfonyl) imide, ammonium fluorosulfate, unreacted fluorosulfonic acid and unreacted sulfamyl fluoride, wherein a concentration of unreacted sulfamyl fluoride in the crude HFSI product composition is less than 0.5 mole percent of the combination of the sulfamyl fluoride and the bis(fluorosulfonyl) imide; separating the ammonium fluorosulfate from the crude HFSI product composition to produce an HFSI product composition; and separating the HFSI product composition into a concentrated HFSI product composition and a top stream composition, the concentrated HFSI product composition including a higher concentration of bis(fluorosulfonyl) imide than the top stream composition.

Aspect 12 is the process of Aspect 11, further including separating the top stream composition into an aqueous composition and an FSA-rich composition, the FSA-rich composition including a higher concentration of fluorosulfonic acid than the aqueous composition.

Aspect 13 is the process of Aspect 12, further including recycling the FSA-rich composition back to the step of mixing the sulfamyl fluoride composition with the additional fluorosulfonic acid or to the step of providing the solution including fluorosulfonic acid, urea and the solvent.

Aspect 14 is the process of any of Aspects 11-13, wherein the process is a continuous process.

Aspect 15 is the process of any of Aspects 11-13, wherein the process is a semi-batch process.

Aspect 16 is the process of any of Aspects 11-15, further including separating the volatile composition into an aqueous composition and an FSA-rich composition, the FSA-rich composition including a higher concentration of fluorosulfonic acid than the aqueous composition.

Aspect 17 is the process of Aspect 16, further including recycling the FSA-rich composition back to the step of mixing the sulfamyl fluoride composition with the additional fluorosulfonic acid or to the step of providing the solution including fluorosulfonic acid, urea and the solvent.

Aspect 18 is the process of Aspect 17 wherein the process is a continuous process.

Aspect 19 is the process of Aspect 17, wherein the process is a semi-batch process.

Aspect 20 is a composition including sulfamyl fluoride and bis(fluorosulfonyl) imide, wherein a concentration of the sulfamyl fluoride is from about 1 mole percent to about 10 mole percent of a combination of the sulfamyl fluoride and the bis(fluorosulfonyl) imide.

Aspect 21 is the composition of Aspect 20, wherein the concentration of the sulfamyl fluoride is from about 2 mole percent to about 9 mole percent of the combination of the sulfamyl fluoride and the bis(fluorosulfonyl) imide.

Aspect 22 is the composition of Aspect 20, wherein the concentration of the sulfamyl fluoride is from about 3 mole percent to about 8 mole percent of the combination of the sulfamyl fluoride and the bis(fluorosulfonyl) imide.

Aspect 23 is the composition of Aspect 20, wherein the concentration of the sulfamyl fluoride is from about 4 mole percent to about 8 mole percent of the combination of the sulfamyl fluoride and the bis(fluorosulfonyl) imide.

Aspect 24 is a composition including sulfamyl fluoride and bis(fluorosulfonyl) imide, wherein a concentration of the sulfamyl fluoride is from about 50 weight percent to about 99.9 weight percent of the composition.

Aspect 25 is the composition of Aspect 24, wherein a concentration of the sulfamyl fluoride is from about 90 weight percent to about 99.9 weight percent of the composition.

Aspect 26 is the composition of Aspect 24, wherein a concentration of the sulfamyl fluoride is from about 95 weight percent to about 99.9 weight percent of the composition.

Aspect 27 is the composition of Aspect 25, wherein a concentration of the sulfamyl fluoride is from about 99.5 weight percent to about 99.9 weight percent of the composition.

The invention claimed is:

1. A composition comprising:
sulfamyl fluoride; and
bis(fluorosulfonyl) imide, wherein a concentration of the sulfamyl fluoride is from about 2 mole percent to about 10 mole percent of a combination of the sulfamyl fluoride and the bis(fluorosulfonyl) imide.

2. The composition of claim 1, wherein the concentration of the sulfamyl fluoride is from about 2 mole percent to about 9 mole percent of the combination of the sulfamyl fluoride and the bis(fluorosulfonyl) imide.

3. The composition of claim 1, wherein the concentration of the sulfamyl fluoride is from about 3 mole percent to about 8 mole percent of the combination of the sulfamyl fluoride and the bis(fluorosulfonyl) imide.

4. The composition of claim 1, wherein the concentration of the sulfamyl fluoride is from about 4 mole percent to about 8 mole percent of the combination of the sulfamyl fluoride and the bis(fluorosulfonyl) imide.

5. The composition of claim 1, wherein the concentration of the sulfamyl fluoride is from about 3 mole percent to about 9 mole percent of the combination of the sulfamyl fluoride and the bis(fluorosulfonyl) imide.

6. The composition of claim 1, wherein the concentration of the sulfamyl fluoride is from about 2 mole percent to about 8 mole percent of the combination of the sulfamyl fluoride and the bis(fluorosulfonyl) imide.

7. The composition of claim 1, wherein the concentration of the sulfamyl fluoride is from about 3 mole percent to about 6 mole percent of the combination of the sulfamyl fluoride and the bis(fluorosulfonyl) imide.

8. The composition of claim 1, wherein the concentration of the sulfamyl fluoride is from about 4 mole percent to about 7 mole percent of the combination of the sulfamyl fluoride and the bis(fluorosulfonyl) imide.

* * * * *